United States Patent Office 3,227,777
Patented Jan. 4, 1966

3,227,777
VULCANIZING ETHYLENE-PROPYLENE COPOLYMERS WITH AN ALKENYLPOLYSILOXANE AND A BIS(ARALKYL)PEROXIDE
Moyer M. Safford, Schenectady, N.Y., assignor to General Electric Company, a corporation of New York
No Drawing. Filed Jan. 24, 1963, Ser. No. 253,740
8 Claims. (Cl. 260—827)

This invention is concerned with vulcanizing ethylene-propylene copolymers. More particularly the invention relates to a heat-vulcanizable composition comprising (1) a copolymer of ethylene and propylene, (2) an alkenyl-polysiloxane (hereinafter so designated) having the formula I      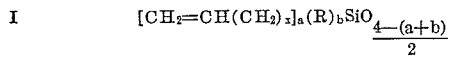

the said alkenyl polysiloxane comprising a minor proportion of the total weight of the latter and the copolymer, and (3) an organic peroxide curing agent for the aforesaid mixture of (1) and (2) where R is an organic radical free of aliphatic unsaturation, $x$ is a whole number equal to from 0 to 1, inclusive, $a$ is a value from 0.05 to 1.5, $b$ is a value of from 0.75 to 2.5, and the sum of $a+b$ is equal to from 1.5 to 3, inclusive. The invention also includes heat-treated vulcanized products derived from the aforesaid vulcanizable compositions.

Homopolymers of ethylene and of propylene today are important commercial compositions and are readily available at relatively low cost. It is known that ethylene and propylene can be copolymerized to give products ranging in form from low molecular weight oils to high molecular weight solids. These copolymers of ethylene and propylene are desirable because they exhibit enhanced rubber-like characteristics, which homopolymers from ethylene or propylene separately do not have. However, it has been difficult in the past to vulcanize or crosslink homopolymers of propylene even though it has been relatively easy to effect crosslinking of homopolymers of ethylene. When the ethylene-propylene copolymers were subjected to vulcanizing or crosslinking conditions similar to those employed for crosslinking polyethylene, it has been found that the presence of the propylene retards this crosslinking.

One method which has been used to effect crosslinking of copolymers of ethylene and propylene involves a crosslinking system having as essential ingredients a di(aralkyl) peroxide of the formula II      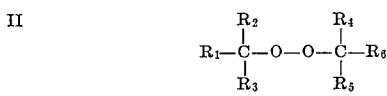

where $R_1$ and $R_6$ are aralkyl radicals and $R_2$, $R_3$, $R_4$, and $R_5$ are hydrogen or alkyl groups of less than four carbon atoms and sulfur. However, one of the disadvantages of such a crosslinking system is that the presence of sulfur prevents using the ethylene-propylene for electrical insulation purposes (which is an important application for these copolymers) when the copolymer will come in direct contact with the conducting metallic core, because the sulfur has a corrosive effect on the metallic core. Because of this, it is necessary to place a barrier between the metallic core and the insulation, thus undesirably increasing the diameter of the insulated conductor.

Unexpectedly, I have discovered that I am able to effect crosslinking of ethylene-propylene copolymers in the absence of sulfur. Moreover, the combination of the alkenylpolysiloxane with an organic peroxide effects ready crosslinking of the ethylene-propylene copolymer and yields products which have satisfactory strengths and elongations, without the corrosion disadvantage recited above. In addition, the compositions obtained in accordance with my invention have improved rubbery characteristics as exemplified by the fact that the percent elongations of these samples are in many instances greatly in excess of 1000 percent.

The normally solid copolymers of ethylene which are treated in accordance with the invention are materials known to the art which can be prepared by copolymerizing ethylene with propylene. The preferred copolymers in the practice of the invention are those obtained from monomer mixtures containing from about 15 to 90 mole percent of ethylene and from 10 to 85 mole percent propylene. The copolymers can also contain small amounts of one or more additional copolymerized unsaturated compounds which are copolymerizable with ethylene and propylene. Such copolymers can be made by any of several processes now known to the art. They can be prepared, for example, by polymerizing ingredients including ethylene and propylene under relatively mild conditions of temperature and pressure in the presence of a catalyst comprising a mixture of a compound of a metal of groups IV–B, V–B or VI–B of the periodic table in combination with an organometallic compound of an alkali metal, alkaline earth metal, zinc, earth metal (especially aluminum) or rare earth metal. The compound of a group IV–VI–B metal may be any inorganic salt or organic salt or complex of titanium, zirconium, hafnium, vanadium, columbium, tantalum, chromium, molybdenum, tungsten, thorium or uranium. Exemplary of such compounds are titanium and zirconium tetrachlorides, tetrabutyl titanate, zirconium acetylacetonate, vanadium oxyacetylacetonate, chromium acetylacetonate, etc. The organometallic compound that is used in combination with the transition metal compound may be any organo compound of an alkali metal, alkaline earth metal, zinc, earth metal, or rare earth metal as, for example, alkali metal alkyls or aryls such as butyllithium, amylsodium, phenyl-sodium, etc., dimethylmagnesium, diethylmagnesium, diethylzinc, butylmagnesium chloride, phenylmagnesium bromide, alkyl- or aryl-aluminum compounds as, for example, triethylaluminum, tripropylaluminum, triisobutylaluminum, trioctylaluminum, dimethylaluminum chloride, diethylaluminum chloride, ethylaluminum dichloride (the equimolar mixture of the latter two being known as aluminum sesquichloride), diisobutylaluminum chloride or fluoride, diethylaluminum hydride, ethylaluminum dihydride, diisobutylaluminum hydride, triphenylaluminum, diphenylaluminum chloride, etc., and complexes of such organometallic compounds as, for example, sodium aluminum tetraethyl, lithium aluminum tetraoctyl, etc. The polymerization is usually carried out by mixing the two catalyst components in a diluent such as a hydrocarbon solvent and then passing ethylene and propylene into the catalyst mixture at atmospheric or slightly elevated pressure and at room temperature or moderately elevated temperatures.

Alternatively, the copolymers processed in the invention can be prepared, for example, by the method described in Belgian Patent No. 535,082 which method is characterized by contacting ingredients including ethylene and propylene under polymerizing conditions with a catalyst containing, as the essential ingredients, an oxide of chromium associated with an oxide of silicon, aluminum, zirconium or thorium.

Still further, such copolymers can be prepared, for example, by the methods described in U.S. 2,700,663, 2,702,288, and 2,726,231 in which the copolymerization of ethylene and propylene is accomplished by bringing a mixture of the two compounds into contact with a subhexavalent molybdenum-oxygen compound combined with an active alumina, titania or zirconia support at a temperature between about 100° C. and 300° C. and a pressure between atmospheric and 5000 p.s.i.g.

The alkenylpolysiloxanes employed in the practice of the present invention may be anyone of those corresponding to Formula I above, where R represents an organic radical free of aliphatic unsaturation. Among the radicals which R may be are, for instance, alkyl radicals (e.g., methyl, ethyl, propyl, butyl, octyl, decyl, octadecyl, etc. radicals); cycloalkyl radicals (e.g., cyclohexyl, cycloheptyl, etc., radicals); aryl radicals (e.g., phenyl, diphenyl, naphthyl, etc. radicals); alkaryl radicals (e.g., tolyl, xylyl, ethylphenyl, etc. radicals); aralkyl radicals (e.g., benzyl, phenylethyl, etc. radicals); and halogenated aryl radicals (e.g., chlorophenyl, dibromophenyl, etc., radicals).

The alkenylpolysiloxanes employed in the practice of this invention can be either fluids (particularly viscous fluids) or gums or other solid polysiloxanes within the scope of Formula I. It will be recognized that the alkenyl radicals can be either vinyl or allyl radicals attached to silicon by C-Si linkages, in addition to the organic R group. Low molecular weight organopolysiloxanes containing silicon-bonded vinyl radicals and methods of preparing such compositions within the scope of Formula I may be found, for example, in Roedel Patent 2,420,911, issued May 20, 1947; Marsden Patent 2,445,794, issued July 27, 1948; Hurd et al. Patent 2,867,599, issued January 6, 1959; and Hurd Patent 2,645,628, issued July 14, 1953.

The relatively low molecular weight organopolysiloxanes (below about 2000 molecular weight) containing a silicon-bonded vinyl radical may be prepared, for example, by hydrolyzing a silane containing at least one silicon-bonded vinyl radical and at least one silicon-bonded hydrolyzable group. Thus, methylvinylsiloxanes may be prepared by hydrolyzing methyl vinyldichlorosilane or methylvinyldiethoxysilane with water or aqueous HCl. This hydrolysis results in an aqueous phase and an organopolysiloxane phase containing both linear and cyclic methylvinylsiloxanes of varying chain lengths. After hydrolysis, the organopolysiloxane phase may be distilled to isolate compounds such as 1,3,5-trimethyl-1,3,5 - trivinylcyclotrisiloxane; 1,3,5,7-tetramethyl-1,3,5,7-tetravinylcyclotetrasiloxane; 1,3,5,7,9-pentamethyl-1,3,5,7,9-pentavinylcyclopentasiloxane; 1,3,5,7,9,11-hexamethyl-1,3,5,7,9,11-hexavinylcyclotetrasiloxane, as well as higher cyclic methylvinylsiloxanes and a number of linear methylvinylsiloxanes (which may be chain-stopped with silanol groups).

Copolymers containing both the alkenyl radicals and the organic R radical can be obtained by copolymerizing alkenyl-containing organopolysiloxanes with one or more cyclic organopolysiloxanes having the formula III        $[(R)_2SiO]_m$ where R has the meaning given above and $m$ is an integer from 3 to 10 or more. Typical compounds within the scope of Formula III include, for example, hexamethylcyclotrisiloxane, octamethylcyclotetrasiloxane, tetramethyltetraethylcyclotetrasiloxane, octaphenylcyclotetrasiloxane, etc. In addition to supplying the saturated organopolysiloxane to the ultimate alkenyl-containing copolymer by means of the cyclic compounds within the scope of Formula III, the saturated organopolysiloxane may be also added in the form of a hydrolyzate of difunctional silanes such as the hydrolyzate of dimethyldichlorosilane, diethyldichlorosilane, methylethyldiacetoxysilane, etc.

A typical mixture of an organopolysiloxane containing silicon-bonded vinyl radicals and an organopolysiloxane containing only organic radicals free of aliphatic unsaturation which may be used to form compositions within the scope of Formula I is a mixture of 1,3,5,7-tetramethyl-1,3,5,7-tetravinylcyclotetrasiloxane with octamethylcyclotetrasiloxane. After mixing these two compounds they may be rearranged and condensed (polymerized) to a gum by effecting reaction with a suitable organopolysiloxane polymerization and condensation catalyst.

Among the catalysts which may be employed for rearranging and condensing the cyclic alkenylpolysiloxane with the non-alkenyl containing cyclopolysiloxane may be mentioned, for instance, potassium hydroxide, cesium hydroxide, rubidium hydroxide, quaternary phosphonium alkoxides, such as tetra n-butyl phosphonium hydroxide, butyltricyclohexyl phosphonium hydroxide, tetra n-butyl phosphonium butoxide, etc. Generally, one can employ from about 0.001 to 1 percent, by weight, of the rearranging and condensation catalyst based on the weight of the organopolysiloxane or mixture of organopolysiloxanes undergoing polymerization. The polymerization and condensation are usually accomplished within times ranging from about 10 to 30 minutes at temperatures of from about 100° C.–175° C.

In addition to the alkenylpolysiloxanes mentioned above, one can also employ alkenyl chain-stopped polysiloxanes of the formula

IV

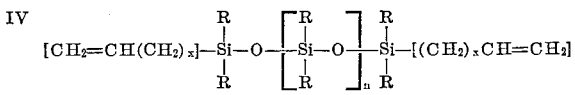

where x and R have the meanings given above and $n$ is a whole number equal to from 0 to 20 or more. Compositions of this type are more particularly disclosed and claimed in application Serial No. 432,332, filed May 25, 1954 in the names of Joseph C. Caprino and Robert J. Prochaska and assigned to the same assignee as the present invention, now U.S. Patent 3,096,303, issued July 2, 1963. By reference this application is made part of the disclosures of the instant application, particularly as far as various compositions corresponding to Formula IV, and methods of preparing the same are concerned. Such compositions are generally prepared by interacting a cyclopolysiloxane of Formula III with a composition having the formula

V

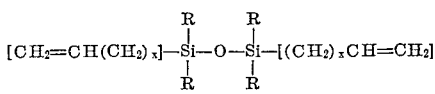

where R and x have the meaning given above. It is not intended that alkenylpolysiloxane employed in the practice of the present invention should be limited to those which have been described above, since it will be apparent to those skilled in the art that other alkenylpolysiloxanes can be employed without departing from the scope in the invention.

The organic peroxide employed in my invention can be anyone of those which are capable of effecting the desired vulcanization of the ethylene-propylene copolymer in the presence of the alkenylpolysiloxane. Particularly exemplary are tertiary peroxides which have the formula VI        

where R has the meaning given above. The additional presence on the organic radicals of these peroxides of inorganic groups such as halogen, nitro groups, etc. for example, chlorophenyl, bromophenyl, nitrophenyl, is not precluded.

A particular class of peroxides which have been found to be eminently useful are those corresponding to Formula II where $R_1$ and $R_6$ are aryl radicals (e.g., phenyl, naphthyl, biphenyl, etc.) and $R_2$, $R_3$, $R_4$ and $R_5$ are hydrogen or alkyl groups of less than 4 carbon atoms, many examples of which have been given for R above. The aryl groups may also contain alkyl substituents as in the case of methylphenyl, ethylphenyl, propylphenyl, butylphenyl, dimethylphenyl, etc., and corresponding alkyl derivatives of the other aryl groups mentioned. The term "aryl" as used herein includes alkaryl groups such as tolyl, xylyl, etc. When an alkyl substituent in an aryl group contains less than 4 carbon atoms, it may be the same as or different from any of $R_2$, $R_3$, $R_4$, or $R_5$ aryl groups in which the alkyl substituents, if any, contain less than 8 carbon atoms are preferred.

Among the organic peroxides which may be employed in the practice of the present invention, may be mentioned dibenzyl peroxide, bis-(α-methylbenzyl) peroxide, bis-(α-propylbenzyl) peroxide, bis-(α-isopropylbenzyl) peroxide, bis-(α,α-dimethylbenzyl) peroxide, bis-(α,α-dimethylnaphthylmethyl) peroxide, bis-(α,α-diethyl-p-ethylbenzyl) peroxide, bis-(α,α-diisopropyl-p-isopropylbenzyl) peroxide, bis-(α-methyl-α-ethyl-p-pentamethylethylbenzyl) peroxide, benzyl(α-methylbenzyl) peroxide, benzyl(α-methyl-p-isopropylbenzyl) peroxide, benzyl(α,α-dimethyl-p-methylbenzyl) peroxide, α-isopropylbenzyl(α,α-diisopropylbenzyl) peroxide; peroxides of the formula

VII

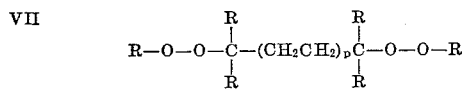

where R has the meaning given above and $p$ is an integer from 1 to 2, inclusive, for instance, 2,5-bis(tertbutylperoxy)-2,5-dimethylhexane, 2,5-bis(tert-amylperoxy)-2,5-dimethylhexane, etc.

A still further class of peroxide which may be employed are those having the formula

VIII

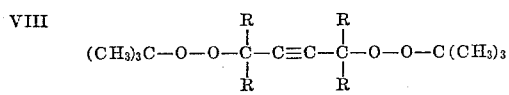

where R has the meanings given above. Many examples of compositions of Formula VIII are found disclosed in U.S. Patent 2,670,384, issued February 23, 1954.

The amount of organic peroxide employed in the practice of the present invention may be varied widely. Generally amounts ranging from about 0.01 to about 10 to 15 percent, by weight, of the peroxide based on the weight of the ethylene-propylene copolymer can be employed.

In general in making the vulcanizable compositions, it is only necessary to mix the ethylene-propylene copolymer with the alkenylpolysiloxane and thereafter add the requisite amount of organic peroxide on the usual milling equipment. Thereafter, this compound can be heated at temperatures of from about 100° C.–175° C. for times ranging from about 5 minutes to 1 hour or more or until such time as the desired cure is obtained. Prior to conversion to the cured vulcanized state, the mixture of ingredients can be extruded and thereafter vulcanized or can be compression molded and vulcanized in place.

In order that those skilled in the art may better understand how the present invention may be practiced, the following examples are given by way of illustration and not by way of limitation. All parts are by weight.

The solid rubbers ethylene-propylene copolymer employed in the following examples comprised a copolymer obtained from copolymerizing 32 mole percent propylene and 68 mole percent ethylene and was identified as EPR–28 sold by Hercules Powder Company, Wilmington, Delaware.

The alkenylpolysiloxane employed in the following examples comprised a methyl vinylpolysiloxane obtained by copolymerizing a mixture of ingredients comprising 62.5 mole percent octamethylcyclotetrasiloxane and 37.5 mole percent of tetramethyl tetravinylcyclopolysiloxane having the formula IX  $[(CH_3)(CH_2=CH)SiO]_4$ This mixture of ingredients was heated at a temperature of about 125° C. for about 15 minutes in the presence of 0.001 percent, by weight, KOH based on the total weight of the two cyclopolysiloxanes. This copolymer, i.e., methylvinylpolysiloxane was a highly viscous barely flowable fluid approaching a somewhat rubbery product.

*Example 1*

In this example, 95 parts of the ethylene-propylene copolymer, 5 parts of the methylvinylpolysiloxane and 1 part bis-(α,α-dimethylbenzyl) peroxide were mixed together on a mill and thereafter pressed into the form of a sheet at a temperature of about 150° C. for one hour at about 500 p.s.i. Thereafter, the cured sheet was tested and found to have the tensile strength of 425 p.s.i. and an elongation of around 1500 percent.

*Example 2*

The same mixture of ingredients was employed as in Example 1 with the exception that 80 parts of the ethylene-propylene copolymer was employed with 20 parts of the methylvinylpolysiloxane copolymer. The mixture of ingredients (containing the 1 part curing peroxide) was heated and pressed similarly as was done in Example 1 and upon testing, the sheet thus obtained was found to have a tensile strength of 633 p.s.i. and an elongation of about 1300 percent.

When the same heat treatment and pressing was carried out on ethylene-propylene copolymer above or on an ethylene-propylene copoylmer containing 1 percent, by weight thereof, of bis-(α,α-dimethylbenzyl) peroxide, in the first instance the tensile strength was 79 p.s.i. and in the second instance the tensile strength was 288 p.s.i.; in both instances the elongation was around 1500 percent.

It will of course be apparent to those skilled in the art that in addition to the particular ethylene-propylene copolymer employed, other ethylene-propylene copolymers may be employed in which the ethylene and propylene are used initially in different molar concentrations. Also the type and quantity of alkenylpolysiloxane which may be employed can be varied without departing from the scope of the invention. Finally, the amount of organic peroxide, or the type of organic peroxide can be varied considerably and no intent is to be read into the claims so as to restrict the invention to those described in the instant examples.

Compositions obtained in accordance with the present invention may have incorporated therein various fillers, particularly reenforcing fillers, such as finely divided silica, carbon black, calcium carbonate, etc., in amounts ranging from about 5 to 100 or more parts of the filler per 100 parts of the ethylene-propylene copolymer. Various modifying agents such as stabilizers against heat and light may be incorporated without departing from the scope of the invention.

The compositions of the invention have many varied uses. They may be used as insulation for electrical conductors; because of the good heat resistance (due to their cured state) and electrical properties of the insulation, they can be employed at elevated temperatures in place of the usual thermoplastic insulated conductors. One of the characteristics of these compositions is that in addition to the good thermal stability they possess good resistance to ozone. Additionally, the presence of the alkenylpolysiloxane enhances greatly the extrudibility of the ethylene-propylene copolymer thereby increasing the usefulness of the vulcanizable compositions for electrical insulation.

What I claim as new and desire to secure by Letters Patent of the United States is:

1. A heat vulcanizable composition comprising (1) a solid copolymer of ethylene and propylene, (2) an alkenylpolysiloxane having the formula

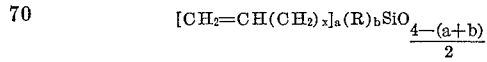

the said alkenylpolysiloxane comprising a minor proportion of the total weight of (1) and (2), and (3) from 0.01 to 10%, by weight, based on the weight of (1), to an organic peroxide curing agent corresponding to the general formula

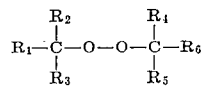

where R is a monovalent organic radical free of aliphatic unsaturation selected from the class consisting of alkyl, aryl, aralkyl, alkaryl, and halogenated aryl radicals, $R_1$ and $R_6$ are aryl radicals, $R_2$, $R_3$, $R_4$, and $R_5$ are members selected from the class consisting of hydrogen and alkyl radicals of less than four carbon atoms, $x$ is a whole number equal to from 0 to 1, inclusive, $a$ is a value from 0.05 to 1.5, $b$ is a value from 0.75 to 2.5, and the sum of $a+b$ is equal to from 1.5 to 3, inclusive.

2. A heat vulcanizable composition as in claim 1 wherein the alkenylpolysiloxane is a methyl vinylpolysiloxane.

3. A heat vulcanizable composition as in claim 1 wherein the organic peroxide is bis-($\alpha,\alpha$-dimethylbenzyl) peroxide.

4. A heat vulcanizable composition as in claim 1 wherein the alkenylpolysiloxane is a methyl vinylpolysiloxane and the organic peroxide is a bis-($\alpha,\alpha$-dimethylbenzyl) peroxide.

5. The heat-treated product of claim 1.

6. The heat-treated product of claim 4.

7. The process for effecting curing of a solid ethylene-propylene copolymer which comprises (1) forming a mixture of ingredients comprising a solid ethylene-propylene copolymer, an alkenylpolysiloxane having the formula

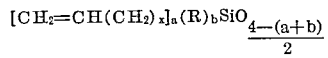

the said alkenylpolysiloxane comprising a minor proportion of the total weight of the latter and the ethylene-propylene copolymer, and from 0.01 to 10%, by weight, based on the weight of the ethylene-propylene copolymer of an organic peroxide corresponding to the general formula

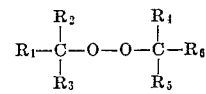

where R is a monovalent organic radical, free of aliphatic unsaturation selected from the class consisting of alkyl, aryl, aralkyl, alkaryl, and halogenated aryl radicals, $R_1$ and $R_6$ are aryl radicals, $R_2$, $R_3$, $R_4$, and $R_5$ are members selected from the class consisting of hydrogen and alkyl radicals of less than four carbon atoms, $x$ is a whole number equal to from 0 to 1, inclusive, $a$ is a value from 0.05 to 1.5, $b$ is a value from 0.75 to 2.5 and the sum of $a+b$ is equal to from 1.5 to 3, inclusive, and (2) heating the mixture of ingredients at a temperature in excess of 100° C. for a time sufficient to effect the desired cure of the ethylene-propylene copolymer.

8. The process as in claim 7 in which the alkenylpolysiloxane is a methyl vinylpolysiloxane and the organic peroxide is bis-($\alpha,\alpha$-dimethylbenzyl) peroxide.

References Cited by the Examiner

UNITED STATES PATENTS

| | | | |
|---|---|---|---|
| 2,867,603 | 1/1959 | Safford et al. | 260—827 |
| 3,039,989 | 6/1962 | Eastman | 260—827 |

FOREIGN PATENTS

| | | |
|---|---|---|
| 1,085,670 | 7/1960 | Germany. |

SAMUEL H. BLECH, *Primary Examiner.*